United States Patent [19]

Back et al.

[11] 4,083,839
[45] Apr. 11, 1978

[54] UNSYMMETRICAL MONO SULFO CONTAINING 1:2 AZO, AZO CHROMIUM COMPLEX DYES

[75] Inventors: Gerhard Back, Lorrach, Germany; Fabio Beffa, Riehen, Switzerland

[73] Assignee: Ciba-Geigy Corporation, Ardsley, N.Y.

[21] Appl. No.: 712,284

[22] Filed: Aug. 6, 1976

Related U.S. Application Data

[63] Continuation of Ser. No. 536,129, Dec. 24, 1974, abandoned.

[30] Foreign Application Priority Data

Jan. 15, 1974 Switzerland .................... 506/74

[51] Int. Cl.² .............................................. C09B 45/16
[52] U.S. Cl. ................................ 260/145 B; 260/147; 260/163
[58] Field of Search ............................ 260/145 B, 147

[56] References Cited

U.S. PATENT DOCUMENTS 3,041,327  6/1962  Buehler et al. .................. 260/145 A

FOREIGN PATENT DOCUMENTS 1,297,014  5/1962  France ............................. 260/145 B
986,655    3/1965  United Kingdom ............. 260/145 B

*Primary Examiner*—Charles F. Warren
*Attorney, Agent, or Firm*—Edward McC. Roberts; Michael W. Glynn; Prabodh I. Almaula

[57] ABSTRACT

Chromium complex dyes of the formula

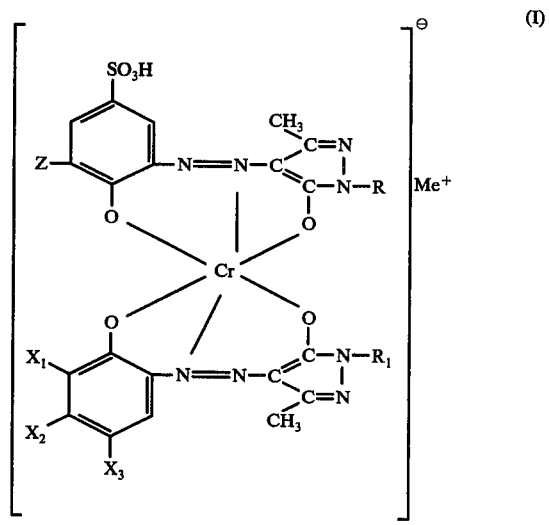

wherein Z is a nitro group or a chlorine atom, each of R and $R_1$ is a phenyl radical which is optionally substituted by halogen, low molecular alkoxy, low molecular alkyl or nitro, one of the symbols $X_1$, $X_2$ and $X_3$ is hydrogen and each of the others is hydrogen, a halogen atom, a nitro, methyl or methoxy group and $Me^+$ is a cation. The dyes are suitable for dyeing and printing natural and synthetic polyamides to produce dyeings which are level and have good fastness to light, washing, fulling, decatizing and carbonizing.

2 Claims, No Drawings

UNSYMMETRICAL MONO SULFO CONTAINING 1:2 AZO, AZO CHROMIUM COMPLEX DYES

This is a continuation of application Ser. No. 536,129, filed on Dec. 24, 1974 and now abandoned.

The present invention provides novel chromium complex dyes of the formula

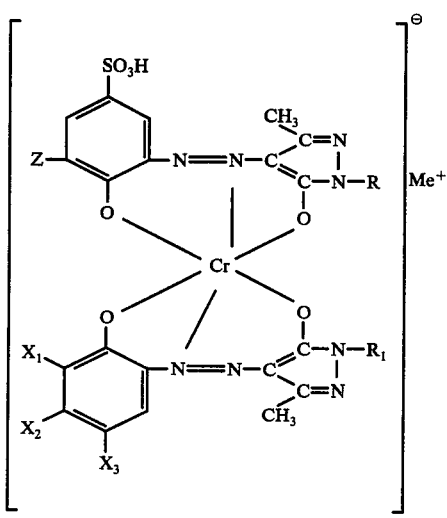

wherein Z is a nitro group or a chlorine atom, each of R and $R_1$ is a phenyl radical which is optionally substituted by halogen, low molecular alkoxy, low molecular alkyl or nitro, one of the symbols $X_1$, $X_2$ and $X_3$ is hydrogen and each of the others is hydrogen, a halogen atom, a nitro, methyl or methoxy group and $Me^+$ is a cation. By halogen is meant in this connection above all chlorine and bromine and the term "low molecular" denotes radicals with 1 to 4 carbon atoms.

The novel chromium complex dyes are manufactured by converting one of the azo dyes of the formula

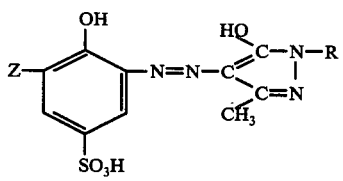

or

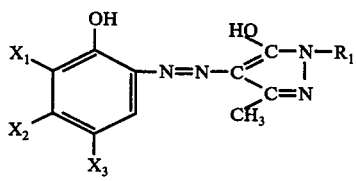

into the 1:1 chromium complex by reaction with a chromium donor and subsequently reacting this compound with the nonmetallised dye of the formula (3) or (2) to give the 1:2 chromium complex.

Preferably, the 1:1 chromium complex is manufactured from the dye of the formula (2) and the dye of the formula (3) is added thereto.

The monoazo dyes of the formula (2) are obtained in known manner by coupling diazotised 2-amino-1-hydroxy-4-sulpho-6-nitrobenzene or 2-amino-1-hydroxy-4-sulpho-6-chlorobenzene to a 1-phenyl-3-methyl-5-pyrazolone and those of the formula (3) by coupling a diazotised aminophenol to a 1-phenyl-3-methyl-5-pyrazolone.

Examples of suitable coupling components for dyes of the formula (2) or (3) are:
1-(2'-ethylphenyl)-3-methyl-5-pyrazolone
1-(4'-bromophenyl)-3-methyl-5-pyrazolone
1-(2'-chloro-6'-methylphenyl)-3-methyl-5-pyrazolone
1-(3'-nitrophenyl)-3-methyl-5-pyrazolone and especially
1-phenyl-3-methyl-5-pyrazolone
1-(2'-,3'- or 4'-chlorophenyl)-3-methyl-5-pyrazolone
1-(2',5'- or 3',4' -dichlorophenyl)-3-methyl-5-pyrazolone
1-(2',5'-dibromophenyl)-3-methyl-5-pyrazolone
1-(2',4', 6'-trichlorophenyl)-3-methyl-5-pyrazolone
1-(4'-methoxyphenyl)-3-methyl-5-pyrazolone.

Suitable diazo components for dyes of the formula (3) are:
2-amino-1-hydroxybenzene
4- or 5-chloro-2-amino-1-hydroxybenzene
4- or 5-nitro-2-amino-1-hydroxybenzene
4-methyl-2-amino-1-hydroxybenzene
4-methoxy-2-amino-1-hydroxybenzene
4,6-dichloro-2-amino-1-hydroxybenzene
4,6-dinitro-2-amino-1-hydroxybenzene
4-chloro-5-nitro-2-amino-1-hydroxybenzene
4-chloro-6-nitro-2-amino-1-hydroxybenzene
6-chloro-4-nitro-2-amino-1-hydroxybenzene
6-nitro-4-methyl-2-amino-1-hydroxybenzene.

The preferred aminophenols are those which carry a nitro group, especially 4- or 5-nitro-2-amino-1-hydroxybenzene and 6-nitro-4-methyl or 4-chloro-2-amino-1-hydroxybenzene.

The conversion of the dyes of the formula (2) or (3) into the 1:1 chromium complex is accomplished by conventional methods which are known per se, e.g. by reacting it in an acid medium with a salt of trivalent chromium, e.g. chromium formate, chromium sulphate, chromium chloride hexahydrate or chromium fluoride, at boiling temperature or optionally at temperatures exceeding 100° C. Trivalent chromium can also be manufactured in the reaction mixture from chromium-(VI) compounds by simultaneously adding a reducing agent, e.g. glucose. In general, it is advisable to carry out the metallising in the presence of organic solvents, preferably e.g. alcohols or ketones, and as far as possible excluding water.

It is normally advantageous not to dry the starting dyes required in the present process after their manufacture and precipitation, but to process them further as a moist paste.

The reaction of the 1:1 chromium complex of the dye of the formula (2) or (3) with the metal-free dye of the formula (3) or (2) is desirably carried out in a neutral to weakly alkaline medium, in an open or a sealed vessel, and at normal or elevated temperature, e.g. at temperatures between 50° and 120° C. The process can be carried out in organic solvents, e.g. alcohols or ketones or in an aqueous solution, in which case the addition of solvents, e.g. alcohols, dimethyl formamide, can promote the reaction if so desired. It is usually advisable to react as far as possible equivalent amounts of the chromium-containing 1:1 complex and the metal-free dye, the molecular ratio between metal-free dye and 1:1 complex being desirably at least 0.85:1 and at most 1:0.85. A surplus of metal-containing dye is usually less disadvantageous than one of metal-free dye. The closer this ratio is to 1:1 the more advantageous the result generally is.

Instead of homogeneous dyes of the formula (2) or (3), it is also possible to use mixtures of corresponding dyes. In this way, interesting shades are often obtained.

The novel chromium-containing mixed complexes obtained by the above processes are isolated with advantage in the form of their salts, in particular alkali salts, above all sodium salts, or also ammonium salts or salts of organic amines with positively charged nitrogen atoms, and are suitable for dyeing and printing the most varied materials, but chiefly for dyeing materials made from natural polyamides, such as silk, leather, and especially wool as well as for dyeing and printing synthetic polyamide fibres, e.g. fibres made from polyamides or polyurethanes. They are mainly suitable for dyeing from a weakly alkaline, neutral or weakly acid bath, for example from an acetic acid bath.

The resultant dyeings are level and have good fastness to light, washing, fulling, decatising, and carbonising.

The following Examples illustrate the invention, the parts and percentages being by weight unless otherwise stated.

EXAMPLE 1

46.9 parts of the 1:1 chromium complex (i.e. containing 1 atom of chromium: 1 molecule of monoazo dye) of the azo dye obtained in known manner from diazotised 6-nitro-2-aminophenol-4-sulphonic acid and 1-phenyl-3-methyl-5-pyrazolone and 33.9 parts of the monoazo dye obtained in known manner from diazotised 5-nitro-2-aminophenol and 1-phenyl-3-methyl-5-pyrazolone are stirred in 1000 parts of hot water. The resultant suspension is adjusted to a pH of 7 to 8 by addition of 20 parts by volume of concentrated sodium hydroxide solution and subsequently stirred until it is no longer possible to detect both starting dyes. The homogeneous chromium mixed complex present in the clear solution is precipitated by addition of sodium chloride, isolated by filtration, washed with sodium chloride solution and dried in vacuo. After it has been ground, the dye is in the form of a dark red, readily water-soluble powder and dyes wool or polyamide fibres from a dyebath containing ammonium sulphate in full, bluish red shades of good fastness properties.

EXAMPLE 2

46.9 parts of the 1:1 chromium complex (1 atom of chromium: 1 molecule of monoazo dye) of the azo dye obtained in known manner from diazotised 6-nitro-2-aminophenol-4-sulphonic acid and 1-phenyl-3-methyl-5-pyrazolone and 38.75 parts of the monoazo dye obtained in known manner from diazotised 6-nitro-4-methyl-2-aminophenol and 1-(3'-chlorophenyl)-3-methyl-5-pyrazolone are stirred in 1000 parts of hot water. The resultant suspension is adjusted to a pH of 7 to 8 by addition of 20 parts by volume of concentrated sodium hydroxide solution and subsequently stirred at 90°–95° C until it is no longer possible to detect both starting dyes. The homogeneous chromium mixed complex present in the clear solution is isolated by addition of sodium chloride, isolated by filtration, washed with sodium chloride solution and dried in vacuo. After it has been ground, the dye is in the form of a dark red readily water-soluble powder and dyes wool or polyamide fibres from a dyebath containing ammonium sulphate in full, red shades of good fastness properties.

EXAMPLE 3

46.9 parts of the 1:1 chromium complex (1 atom of chromium: 1 molecule of monoazo dye) of the azo dye obtained in known manner from diazotised 6-nitro-2-aminophenol-4-sulphonic acid and 1-phenyl-3-methyl-5-pyrazolone and 33.9 parts of the monoazo dye obtained in known manner from diazotised 4-nitro-2-aminophenol and 1-phenol-3-methyl-5-pyrazolone are stirred in 1000 parts of hot water. The resultant suspension is adjusted to a pH of 7 to 8 by addition of 20 parts of concentrated sodium hydroxide solution and subsequently stirred at 90°–95° C until it is no longer possible to detect both starting dyes. The homogeneous chromium mixed complex present in the clear solution is isolated by addition of sodium chloride, isolated by filtration, washed with sodium chloride solution and dried in vacuo. After it has been ground, the dye is in the form of a dark red, readily water-soluble powder and dyes wool or polyamide fibres from a dyebath containing ammonium sulphate in full, reddish orange shades of good fastness properties.

A homogeneous mixed complex which dyes wool or polyamide fibres from a weakly acid bath in full, scarlet shades is obtained by reacting with the above mentioned 1:1 chromium complex 36.3 parts of the monoazo dye obtained from diazotised 2-aminophenol and 1-2',5'-dichlorophenol-3-methyl-5-pyrazolone instead of the metal-free azo dye used in this Example.

EXAMPLE 4

46.9 parts of the 1:1 chromium complex (1 atom of chromium: 1 molecule of monoazo dye) of the azo dye obtained in known manner from diazotised 6-nitro-2-aminophenol-4-sulphonic acid and 1-phenyl-3-methyl-5-pyrazolone and 35.3 parts of the monoazo dye obtained in known manner from diazotised 6-nitro-4-methyl-2-aminophenol and 1-phenyl-3-methyl-5-pyrazolone are stirred in 1000 parts of hot water. The resultant suspension is adjusted to a pH of 7 to 8 by addition of 20 parts by volume of concentrated sodium hydroxide solution and subsequently stirred at 90°–95° C until it is no longer possible to detect both starting dyes. The homogeneous chromium mixed complex present in the clear solution is precipitated by addition of sodium chloride, isolated by filtration, washed with sodium chloride solution and dried in vacuo. After it has been ground, the dye is in the form of a dark red, readily water-soluble powder and dyes wool or polyamide fibres from a dyebath containing ammonium sulphate in full, red shades of good fastness properties.

EXAMPLE 5

40.85 parts of the 1:1 chromium complex (1 atom of chromium: 1 molecule of monoazo dye) of the azo dye obtained in known manner from diazotised 6-chloro-2-aminophenol-4-sulphonic acid and 1-phenyl-3-methyl-5-pyrazolone and 33.9 parts of the monoazo dye obtained in known manner from diazotised 4-nitro-2-aminophenol and 1-phenyl-3-methyl-5-pyrazolone are stirred in 1000 parts of water. The resultant suspension is adjusted to a pH of 7 to 8 by addition of 20 parts by volume of sodium hydroxide solution and subsequently stirred at 90°–95° C until it is no longer possible to detect the starting dyes. The homogeneous chromium mixed complex is precipitated by addition of sodium chloride, isolated by filtration, washed with sodium chloride solution and dried in vacuo. After it has been ground, the dye is in the form of a dark red, readily water-soluble powder and dyes wool or polyamide fibres from a dyebath containing ammonium sulphate in full, yellowish orange shades of good fastness properties.

EXAMPLE 6

46.9 parts of the 1:1 chromium complex (1 atom of chromium: 1 molecule of monoazo dye) of the azo dye obtained in known manner from diazotised 6-nitro-2-aminophenol-4-sulphonic acid and 1-phenyl-3-methyl-5-pyrazolone, 16.95 parts of the monoazo dye obtained in known manner from diazotised 4-nitro-2-aminophenol and 1-phenyl-3-methyl-5-pyrazolone and 17.65 parts of the monoazo dye obtained from diazotised 6-nitro-4-methyl-2-aminophenol and 1-phenyl-3-methyl-5-pyrazolone are stirred in 100 parts of hot water. The resultant suspension is adjusted to a pH of 7 to 8 and subsequently stirred at 90°–95° C until it is no longer possible to detect any of the starting dyes. The chromium mixed complexed present in clear solution are precipitated by the addition of sodium chloride, isolated by filtration, washed with sodium chloride solution and dried in vacuo.

After it has been ground, the novel dye is in the form of a red, readily water-soluble powder and dyes wool or polyamide from a dyebath containing ammonium sulphate in full, fast scarlet shades.

We claim:

1. The dye of the formula

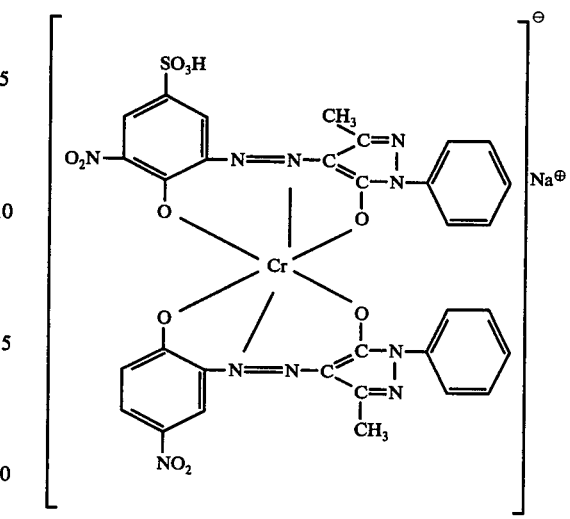

2. The dye of the formula

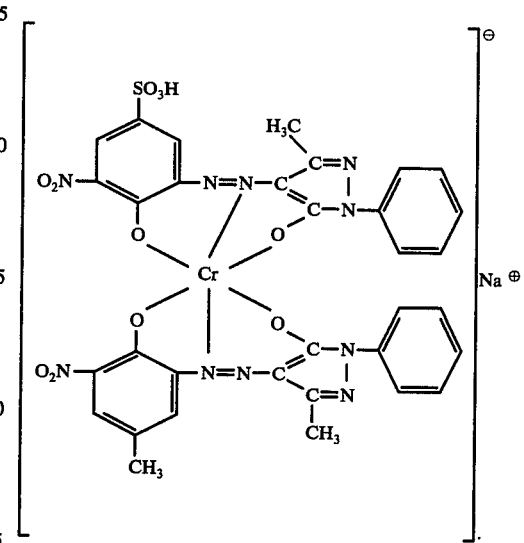

* * * * *